United States Patent [19]
Ho et al.

[11] Patent Number: 5,113,364
[45] Date of Patent: May 12, 1992

[54] CONCURRENT STICKY-BIT DETECTION AND MULTIPLICATION IN A MULTIPLIER CIRCUIT

[75] Inventors: Ying-Wai Ho, Austin, Tex.; Peter L. Harrod, Cherry Hinton, England; Ashok H. Someshwar, Austin, Tex.

[73] Assignee: Motorola, Inc., Schaumburg, Ill.

[21] Appl. No.: 604,854

[22] Filed: Oct. 29, 1990

[51] Int. Cl.⁵ .............................................. G06F 7/52
[52] U.S. Cl. .................................................. 364/757
[58] Field of Search ................... 364/754, 757–760

[56] References Cited

U.S. PATENT DOCUMENTS

| | | | |
|---|---|---|---|
| 4,864,527 | 9/1989 | Peng et al. | 364/748 |
| 4,887,232 | 12/1987 | Wolrich et al. | 364/754 |
| 4,893,268 | 1/1990 | Denman | 364/759 |
| 4,928,259 | 5/1990 | Galbi et al. | 364/757 X |

Primary Examiner—Tan V. Mai
Attorney, Agent, or Firm—Robert L. King

[57] ABSTRACT

An array multiplier calculates a Sticky-Bit concurrently with an iterative multiply operation using a predetermined number of multiplier arrays. An n-bit multiplicand operand provides a continuous input for each multiplier array. An n-bit multiplier operand is divided into a number of smaller sub-operands and each sub-operand is utilized for each cycle of the multiply operation. Each multiply cycle produces an intermediate accumulated partial product represented as sum and carry data, and a portion of the final product. The intermediate accumulated partial product is used as an input to a subsequent multiplier array for the following multiply cycle. A final accumulated partial product is summed in an adder to determine a completed product. During each cycle of the multiply operation, the Sticky-Bit detection logic detects and accumulates the Sticky-Bit concurrently with the multiply operation.

11 Claims, 3 Drawing Sheets

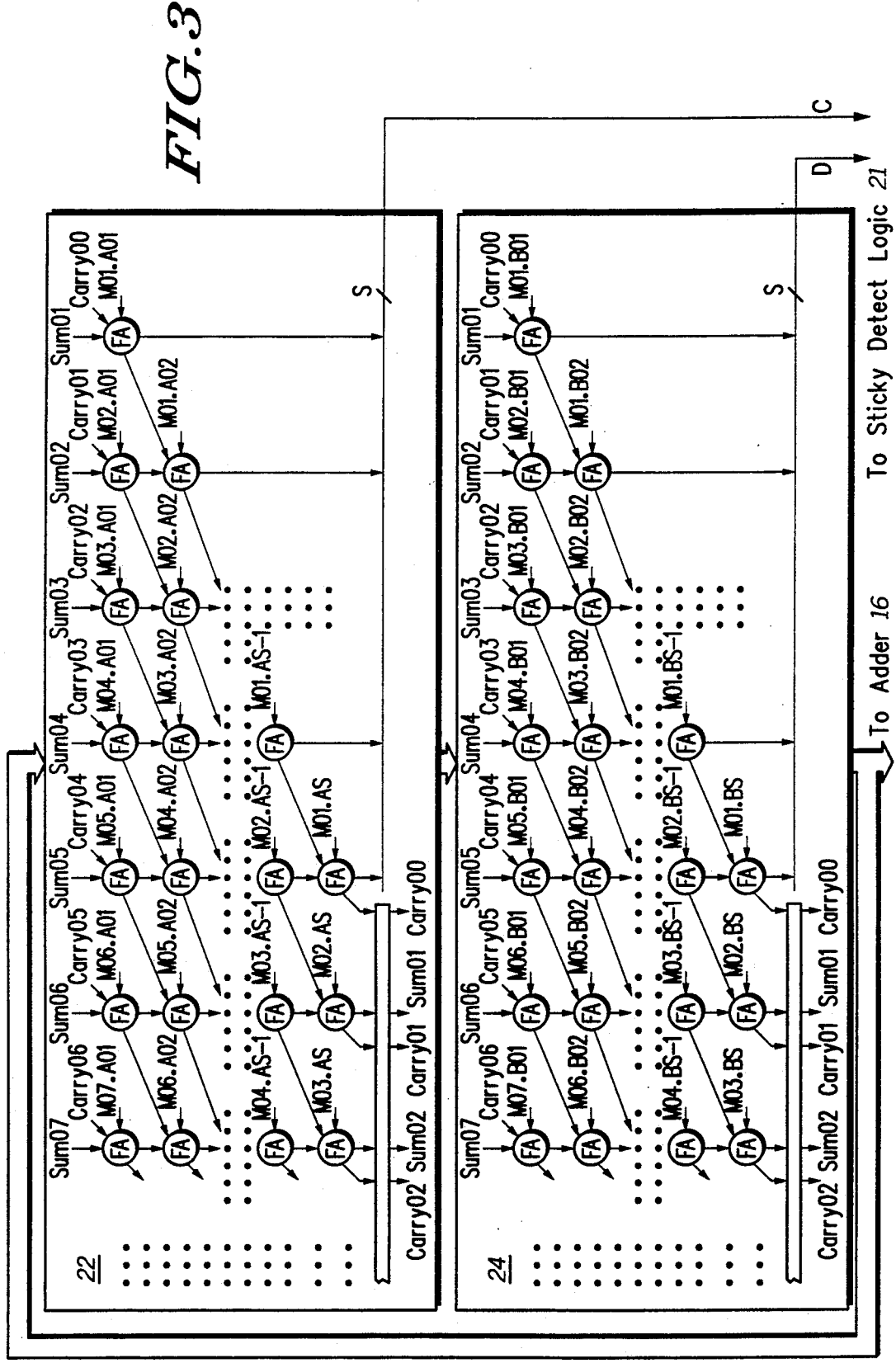

CONCURRENT STICKY-BIT DETECTION AND MULTIPLICATION IN A MULTIPLIER CIRCUIT

FIELD OF THE INVENTION

This invention relates generally to multipliers, and more particularly, to multiplier array circuits.

BACKGROUND OF THE INVENTION

Data processors that utilize hardware multipliers implement multipliers as either an integer hardware multiplier or a floating-point hardware multiplier. The output of an integer hardware multiply operation is non-fractional whereas the output of a floating-point hardware multiply operation is expressed using an exponential portion, a sign portion and a mantissa portion. Illustrated in FIG. 1 is a floating-point multiply operation which generally comprises the multiplication of two n-bit sized normalized mantissas, where n is an integer. The multiplication of the two n-bit sized operands produces a (2n) bit sized product output. The data output format of a floating-point hardware multiplier generally adheres to standards established within the IEEE Standard for Binary Floating-Point Arithmetic (ANSI-IEEE Std 754-1985). One aspect of the standard involves the rounding precision to which the output is represented. Various pieces of information are required to implement the rounding procedure; one such piece of information is a "Sticky-Bit", where a Sticky-Bit is the logical OR of a predetermined portion, typically (n−2) bits of the lower order output bits. Known methods for implementing Sticky-Bit detection differ in one way by having differing multiplier circuit area requirements and differing amounts of time required to calculate a Sticky-Bit condition. Referring to FIG. 1, a common method of calculating the Sticky-Bit is illustrated in diagrammatic form. All of the (2n) product bits are calculated before preforming the logical OR of the least significant (n−2) product bits. This method requires additional multiplier hardware since circuitry is required to calculate product bits which are subsequently truncated. Also, additional time for the multiply operation is required to calculate all of the product bits before beginning the Sticky-Bit operation. Therefore, overall system performance of a data processor system having a multiplier is reduced.

SUMMARY OF THE INVENTION

Accordingly, there is provided, in one form, a multiplier circuit, and method of use, which performs Sticky-Bit detection that is substantially concurrent with a multiplication of two input numbers of predetermined bit width. The multiplier comprises a multiplier array having a first and a second input, a feedback input, a first output for providing sum and carry bits resulting from a multiplication of the two input numbers. The feedback input receives intermediate sum and carry bits generated by the multiplier array when multiplying the two input numbers. A second output of the array provides a first predetermined number of product bits for determining Sticky-Bit information. A first storage circuit receives and stores a first of the two input numbers in predetermined segmented portions. The first storage circuit has an output coupled to the first input of the multiplier array for successively providing the segmented portions of the first input number to the multiplier array. A second storage circuit receives and stores a second of the two input numbers and has an output coupled to the multiplier array for providing the second input number to the multiplier array. An adder is coupled to the first output of the multiplier array for receiving and adding output sum and carry bits of the array to provide a second predetermined number of bits as a final product output. Sticky-Bit detection logic is coupled to the second output of the multiplier array for receiving the first predetermined number of product bits and generating a Sticky-Bit concurrent with providing the sum and carry bits of the multiplication by using the first predetermined number of product bits to generate the Sticky-Bit before the final product is generated. These and other features, and advantages, will be more clearly understood from the following detailed description taken in conjunction with the accompanying drawings.

BRIEF DESCRIPTION OF THE DRAWINGS

FIG. 3 illustrates in array diagram form a portion of the multiplier arrays.

DESCRIPTION OF A PREFERRED EMBODIMENT

Figure 2:
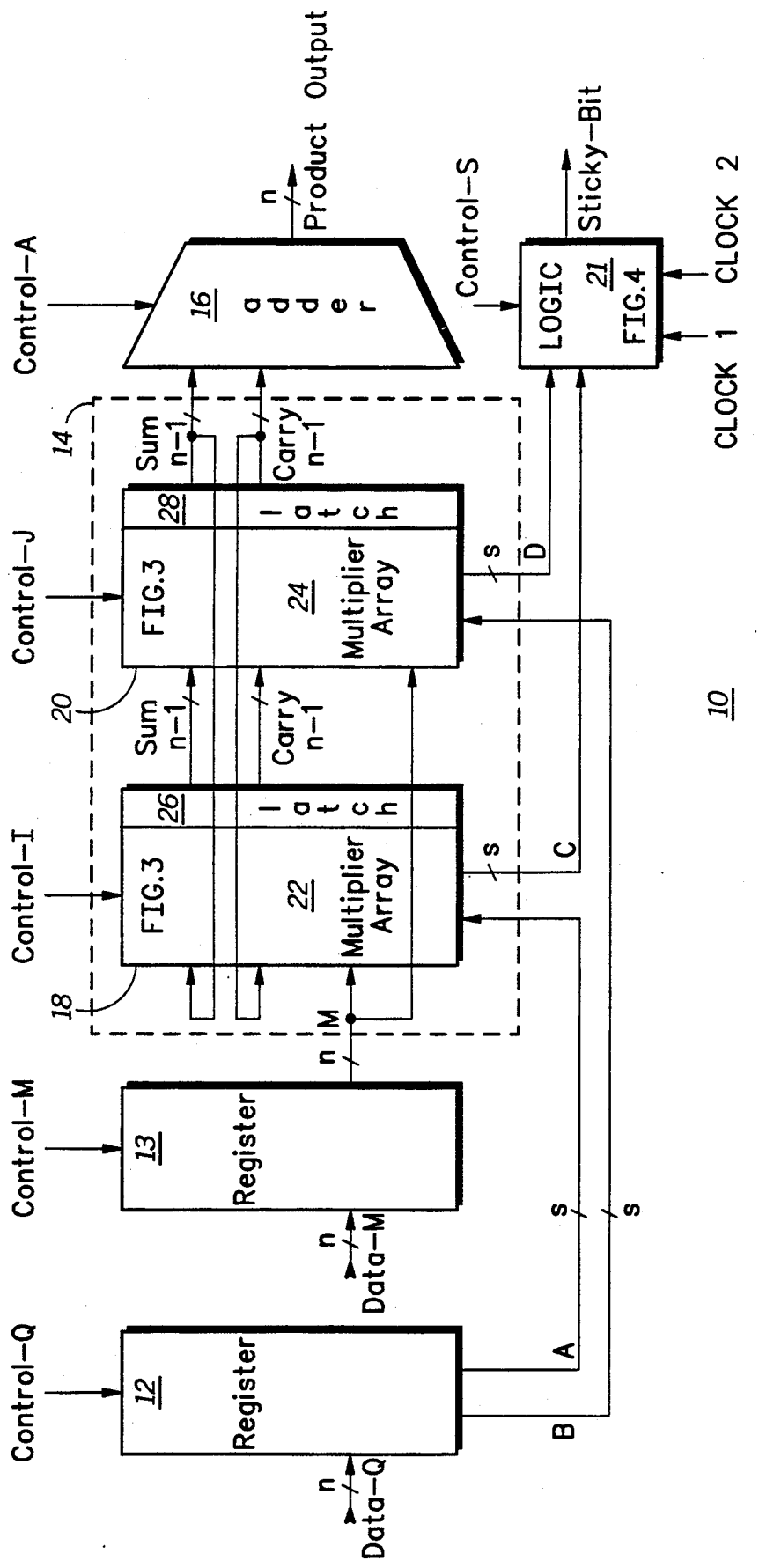
FIG. 2 illustrates in block diagram form a hardware multiplier in accordance with the present invention.

Shown in FIG. 2 is a block diagram of a multiplier circuit 10 which comprises an n-bit wide register 12 having the ability to internally shift a subportion of the n-bits containing s-bits of data, an n-bit wide register 13, a multiplier unit portion 14 which comprises two multiplier cells 18 and 20, an adder circuit 16, and a Sticky-Bit logic circuit 21. In this discussion, "s" and "n" are each a predetermined integer value.

Multiplier cells 18 and 20 respectively comprise multiplier arrays 22 and 24 and output latches 26 and 28, respectively. Multiplier arrays 22 and 24 are respectively connected to output latches 26 and 28. Multiplier arrays 22 and 24 are each n-bits in length (vertically) by s-bits wide (horizontally). Register 12 has an input for receiving n-bits of multiplier operand data from a data signal labeled "Data-Q", and a control input for receiving a control signal labeled "Control-Q". Further, register 12 is divided into s-bit wide groups of data called "sub-operands" which are provided as output signals "A" and "B". Multiplier arrays 22 and 24 of FIG. 2 each has an input to receive sub-operands A and B from the output of register 12. Register 13 has an input for receiving n-bits of data from a data signal labeled "Data-M", and an input for receiving a control signal labeled "Control-M". Each of multiplier arrays 22 and 24 has an input to receive n-bits of data (multiplicand M) from storage register 13, and each array has an s-bit output to provide product signals labeled "C" and "D", respectively. Further, each of multiplier arrays 22 and 24 has a control input for receiving control signals labeled "Control-I" and "Control-J", respectively. For each intermediate multiply cycle, latches 26 and 28 each provides an intermediate partial sum and intermediate partial carry data for each subsequent multiply cycle. Adder 16 of FIG. 2 has an input for receiving final sum data and final carry data from multiplier output latch 28. Further, adder 16 has a control input for receiving a control signal labeled "Control-A", and provides an n-bit output signal labeled "Product Output". The Sticky-Bit logic circuit 21 of FIG. 2 has a first and a second input to respectively receive product signals "C" and "D" from multiplier arrays 22 and 24, respectively, a control input for receiving a control signal labeled "Control-S", a first clock input for receiving a clocking signal labeled "Clock 1", a second clock input for receiving a clocking signal labeled "Clock 2", and provides an output signal labeled "Sticky-Bit".

Illustrated in FIG. 3 is an array diagram of a portion of the least significant bits of both of multiplier arrays 22 and 24. Each of multiplier arrays 22 and 24 contains a predetermined number of Full-Adder cells labeled "FA". Each Full-Adder cell has an input for receiving a sum feedback signal labeled "Sum", a carry feedback signal labeled "Carry", and an input for receiving a signal representing the multiply of a multiplicand bit and a multiplier bit labeled either "Mx·Ay" or "Mx·By" for multiplier array 22 or 24, respectively. Each Full-Adder cell has two outputs for respectively providing sum data and carry data. The sum data and carry data outputs of the Full-Adder cells illustrated in FIG. 3, which are not labeled, can be recognized as follows: the sum outputs are the vertical outputs from each Full-Adder cell and the carry outputs are the diagonal outputs from each Full-Adder cell. Each row of both of multiplier arrays 22 and 24 has $(n-1)$ Full-Adder cells. Further, the $(n-1)$ Full-Adder cells are used to sum accumulated partial product outputs with the n-bit current partial products where an n-bit current partial product is represented as the multiplied output of the entire n-bit multiplicand M with one bit from sub-operand A or B. The accumulated partial products are represented in terms of sum and carry bits and are generated from the Full-Adder cells of row "$i-1$", where "i" represents an arbitrary row of Full-Adders contained within multiplier arrays 22 and 24. Multiplier arrays 22 and 24 respectively provide final product outputs C and D, each containing s-bits of data located in the least significant bit portion of each multiplier array.

Figure 1:
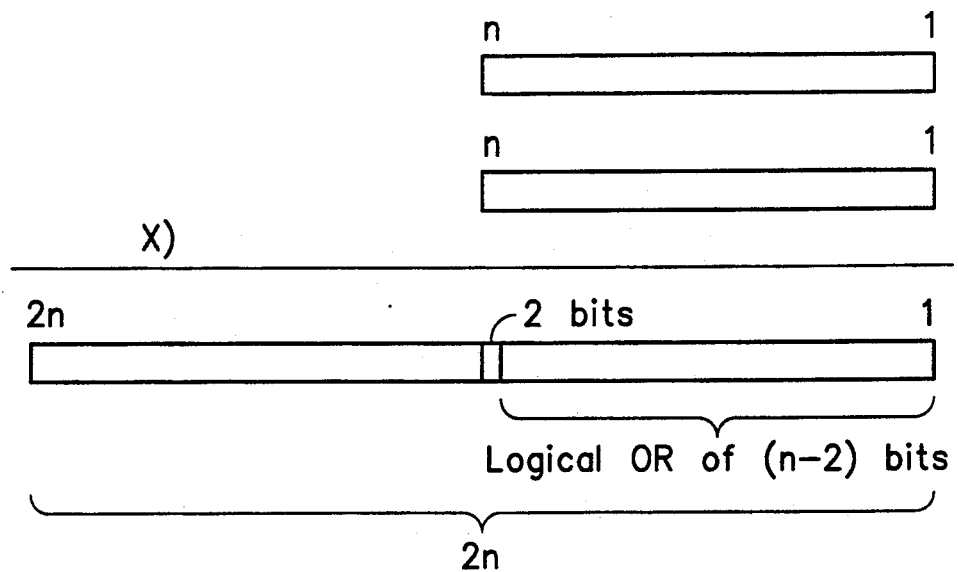
FIG. 1 illustrates in diagrammatic form an example of a floating-point multiply operation.
Figure 4:
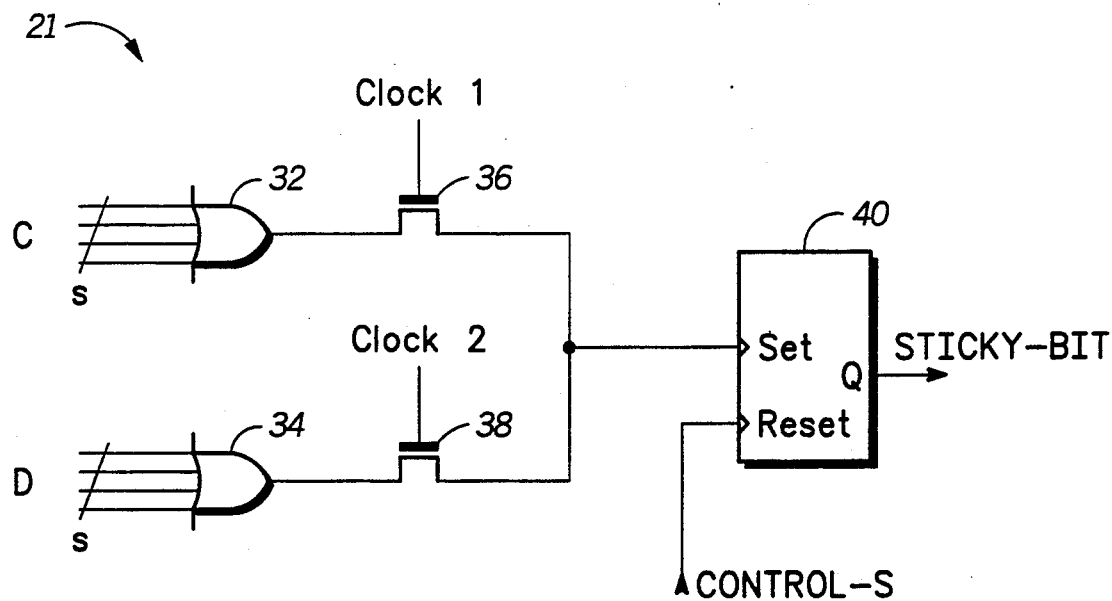
FIG. 4 illustrates in partial schematic form Sticky-Bit detection logic in accordance with the present invention.

The Sticky-Bit logic circuit 21 of FIG. 4 has two OR gates 32 and 34, two transistor switches 36 and 38 and a Set-Reset latch 40. The OR gates 32 and 34 each have an s-bit input for respectively receiving data signals C and D from multiplier arrays 22 and 24, respectively. An output of OR gate 32 is connected to a first terminal of transistor switch 36, and an output of OR gate 34 is connected to a first terminal of transistor switch 38. Second terminals of each of transistor switches 36 and 38 are connected together and to a "Set" input of Set-Reset latch 40. Transistor switch 36 has a control terminal for receiving a clock signal labeled "Clock 1", and transistor switch 38 has a control terminal for receiving a clock signal labeled "Clock 2". Clock 1 and Clock 2 are non-overlapping clock signals and correspond to the evaluation and subsequent latching time period of multiplier cells 18 and 20 of FIG. 2, respectively. The Set-Reset latch 40 of FIG. 4 has a "Set" input connected to the second terminal of switches 36 and 38, a "Reset" input connected to a control signal labeled "Control-S", and has an output "Q" for providing a signal labeled "Sticky-Bit".

In operation, a control unit (not illustrated) is used to control the data input operand latching (Control-Q and Control-M). The control unit is also used to control the sequence of operation of the multiplier arrays 22 and 24 and latches 26 and 28 (Control-I and Control-J). Further, the control unit is used to control the summing of the final sum and final carry into adder 16 (Control-A), and to control the "Sticky-Bit" logic 21 of FIG. 2 (Control-S).

The multiply operation begins with the multiplier operand data "Data-Q" being latched into register 12 of FIG. 2 by the control signal "Control-Q", and multiplicand operand data "Data-M" being latched into register 13 of FIG. 2 by control signal "Control-M" at a predetermined time. The control signal "Control-Q" also provides control for grouping sub-operands "A" and "B" in accordance with each multiply cycle. Further, Control-Q selects a predetermined subsequent portion of register 12, starting with the least significant bit position of register 12, as sub-operands "A" and "B" for each cycle of the multiply operation. The control signal "Control-I" controls the evaluation timing of multiplier array 22 and the latching control for multiplier output latch 26 of FIG. 2. Similarly, control signal "Control-J" controls the evaluation timing of multiplier array 24 and the latching control of multiplier output latch 28 of FIG. 2.

The number of multiply cycles required for the multiplier illustrated in FIG. 2 is $[n/(p \cdot s)]$, where "n" is the number of bits contained within the multiplicand register 13, "p" is the number of multiplier arrays and "s" is the number of bits contained within each sub-operand portion of multiplier register 12. For example, for an extended floating-point multiply operation the value of "n" would be sixty-four, an arbitrary number of multiplier arrays "p" is two, an arbitrary number of bits contained within each s-bit sub-operand is four, and the number of required multiply cycles would then be eight. It is also necessary that the calculated value for the number of multiply cycles, according to the above formula, be an integer number. Each multiply cycle is divided into two sub-cycles, each having an evaluation and subsequent latching time period. The first sub-cycle comprises the multiplication of the n-bit multiplicand contained within register 13 with the s-bit sub-operand "A", summed with the feedback inputs sum and carry. For the first sub-cycle of the first multiply cycle of the first multiply operation, the sum and carry inputs to each Full-Adder cell of FIG. 3 are equal to zero. There are two outputs of the first sub-cycle of multiplication. The first output, containing $(n-1)$ sum and $(n-1)$ carry outputs, is latched into latch 26 and represents intermediate partial product outputs. The second output of the first sub-cycle of multiplication is a final product output to be used in determining an intermediate value of Sticky-Bit. The second multiply sub-cycle comprises the multiplication of the n-bit multiplicand operand from register 13 with multiplier s-bit sub-operand "B" which is summed with the partial product outputs from the first multiply sub-cycle. The partial product outputs of each multiply sub-cycle are used for the following multiply sub-cycle and each multiply cycle utilizes a subsequent sub-operand from register 12. The multiply operation is complete when the predetermined number of multiply cycles have executed and the final sum and final carry outputs residing in latch 28 are summed together in adder 16 to produce the final n-bit product output in response to the control signal "Control-A".

At the beginning of each multiply operation, the control signal "Control-S" of Sticky-Bit logic 21 initializes Set-Reset latch 40 of FIG. 4. For each sub-cycle of every multiply cycle, the final product output signals "C" and "D" are respectively connected to the inputs of OR gates 32 and 34 of FIG. 4. When product signals "C" and "D" are valid, transistor switches 36 and 38 become active in response to control signals Clock 1 and Clock 2, respectively. When transistor switches 36 and 38 are active, the outputs of OR gates 32 and 34 are alternatively connected to the Set input of Set-Reset latch 40 of FIG. 4. Further, if the outputs of OR gates 32 or 34 are active when connected to the Set input of Set-Reset latch 40, the Sticky-Bit output of Set-Reset latch 40 will become active signifying the presence of a Sticky-Bit. If a Sticky-Bit is detected during the multiply operation by Set-Reset latch 40, the active logic state of Set-Reset latch 40 will remain active throughout the current multiply operation, and not until a new multiply operation begins will the active logic state of Set-Reset latch 40 be cleared by an active "Control-S" signal. Since the Sticky-Bit evaluation is done in parallel with each multiply cycle, there is no additional time required to implement this function as compared to existing known methods. In known array multipliers, sub-operands such as C and D are accumulated in a register during a multiply operation. Only after the multiply operation is complete is a Sticky-Bit determination made.

In summary, Sticky-Bit information is used in the rounding mode operation of a floating-point multiply instruction. To reduce the overall multiply execution time, an array multiplier that concurrently calculates a Sticky-Bit with a multiply operation is provided. The multiply operation begins with two n-bit operands, a multiplier and a multiplicand, being latched into two registers before a multiply cycle begins. The n-bit multiplicand serves as a constant input operand for the multiply cycle and is connected to each multiplier array. The n-bit multiplier operand is divided into smaller portions called sub-operands. For each cycle of the multiply operation, a predetermined sub-operand is used to calculate intermediate partial products which are also connected to the input of a subsequent multiply array. Once each sub-operand has been utilized, the final partial product output as represented in terms of Sum and Carry bits, are summed in an adder to produce the final product output. As each sub-operand multiply cycle produces intermediate partial product outputs, final product information is also produced. The final product information from each sub-operand multiply cycle is connected to a Sticky-Bit detection logic circuit for a concurrent evaluation of a Sticky-Bit. When the final multiply product output from the adder is known, the Sticky-Bit detection logic has completed the evaluation of Sticky-Bit.

It should be apparent that although two multiply arrays are illustrated, an array multiplier having any number of multiply arrays may be used, various input multiplexing schemes for providing the sub-operands can be implemented, and different multiplier array output latching schemes that provide correctly timed inputs to each subsequent multiplier array can be implemented.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:
1. A multiplier circuit, comprising:
multiplier array means having first and second inputs, the first input receiving a first input number and the second input successively receiving predetermined segmented portions of a second input number during a plurality of multiply cycles, a feedback input, a first and a second output for respectively providing intermediate sum and intermediate carry bits resulting from a multiplication of the first and second input numbers, the feedback input receiving the intermediate sum and carry bits generated from a previous multiply cycle except during a first multiply cycle of the plurality of multiply cycles, and a third output for providing a portion of a final product for each of the plurality of multiply cycles for determining Sticky-Bit information concurrent with providing the intermediate sum and carry bits;
first storage means for receiving and storing the second input number, the first storage means having an output coupled to the second input of the multiplier array means for successively providing the predetermined segmented portions of the second input number to the multiplier array means;
second storage means for receiving and storing the first input number, the second storage means having an output coupled to the multiplier array means for providing the first input number to the multiplier array means;
adder means coupled to the first and second outputs of the multiplier array means to accumulate the intermediate sum bits and intermediate carry bits from each of the plurality of multiply cycles to provide a completed accumulation of the final product; and
detection means coupled to the third output of the multiplier array means for receiving the portion of the final product for each of the plurality of multiply cycles and generating a Sticky-Bit which provides operand rounding precision information concurrent with providing the intermediate sum and carry bits of the multiplication to generate the Sticky-Bit before the final product is generated.

2. The multiplier circuit of claim 1 wherein said multiplier array means further comprise:
a first multiplier array having a first input for receiving the first input number, a second input for receiving a first predetermined portion of the second input number, a third and a fourth input, a first output for providing intermediate sum bits, a second output for providing intermediate carry bits, and a third output for providing a first portion of the final product for each of the plurality of multiply cycles; and
a second multiplier array having a first input for receiving the first input number, a second input for receiving a second predetermined portion of the second input number, a third input coupled to the first output of the first multiplier array, a fourth input coupled to the second output of the first multiplier array, a first output coupled to the third input of the first multiplier array for providing intermediate carry bits, a second output coupled to the fourth input of the first multiplier array for providing intermediate sum bits, and a third output for providing a second portion of the final product for each of the plurality of multiply cycles.

3. The multiplier circuit of claim 2 wherein each of the first and second multiplier arrays comprises:
a plurality of full adder circuits positioned in predetermined columns and rows, each full adder circuit having a first input for receiving a predetermined intermediate carry bit, a second input for receiving a predetermined intermediate sum bit, a third input for receiving a product of predetermined bits of the first and second input numbers, a sum output and a carry output, the plurality of full adder circuits in the second multiplier array providing the intermediate sum and carry bits which are coupled to the adder means.

4. The multiplier circuit of claim 2 wherein each of the first and second multiplier arrays comprises a latch coupled to the first and second outputs thereof for storing and selectively providing intermediate sum and carry bits at the first and second outputs of each multiplier array.

5. The multiplier circuit of claim 2 wherein the detection means further comprise:
a first OR logic gate having a plurality of inputs coupled to the third output of the first multiplier array, each input thereof receiving a predetermined one of the first portion of the first predetermined number of product bits, and having an output;
a second OR logic gate having a plurality of inputs coupled to the third output of the second multiplier array, each input thereof receiving a predetermined one of the second portion of the first predetermined number of product bits, and having an output;
a first switch having a first terminal coupled to the output of the first OR logic gate and having a second terminal;
a second switch having a first terminal coupled to the output of the second OR logic gate and having a second terminal coupled to the second terminal of the first switch; and
a latch having an input coupled to the second terminals of the first and second switches, and having an output for providing the Sticky-Bit.

6. The multiplier circuit of claim 5 wherein the first and second switches each have a control terminal for respectively receiving non-overlapping clock signals and the latch is a set-reset latch.

7. The multiplier circuit of claim 1 wherein the detection means further comprise:
an OR logic gate having a plurality of inputs coupled to the third output of the multiplier array means, each input receiving a predetermined bit of the final product for each of the plurality of multiply cycles, and having an output;
a switch having a first terminal coupled to the output of the OR logic gate, a second terminal, and a control terminal for receiving a control signal; and
a latch having an input coupled to the second terminal of the switch, and an output for providing the Sticky-Bit.

8. In a multiplier circuit, a method of determining Sticky-Bit information which provides operand rounding precision information, comprising the steps of:
receiving and storing first and second input operands;
coupling the first input operand to an array multiplier comprising predetermined columns and rows of full adder circuits;
repetitively coupling predetermined portions of the second input operand to the array multiplier and repetitively multiplying each predetermined portion of the second input operand by the first input operand to generate intermediate sum and carry bits and a portion of a final product for each multiplying of each portion of the second input operand by the first input operand;
repetitively checking for a Sticky-Bit by performing a logic OR operation of a predetermined number of bits of the portion of the final product provided during each repetitive multiply operation of the array multiplier to provide a Sticky-Bit output signal indicating whether or not a Sticky-Bit exists prior to completion of the multiplication operation; and
summing the intermediate sum and carry bits to provide a completed output product without performing subsequent calculations to implement Sticky-Bit detection.

9. A multiplier circuit which performs Sticky-Bit detection associated with a multiplication of two input numbers of predetermined bit width, comprising:
first and second multiplier arrays, each array having first and second inputs, a feedback input, first and second outputs for respectively providing intermediate sum and carry bits each multiply cycle of a plurality of multiply cycles which are required to implement a multiplication of the two input numbers, the feedback input receiving the intermediate sum and carry bits generated from a previous multiply cycle except during a first multiply cycle, and a third output for providing a portion of a final product during each of the plurality of multiply cycles, the third output being used for determining Sticky-Bit information concurrent with providing the intermediate sum and carry bits;
a first register for receiving and storing a first of the two input numbers in predetermined segmented portions, the first register having an output coupled to the first input of each of the first and second multiplier arrays for successively providing predetermined segmented portions of the first input number respectively to the first and second multiplier arrays;
a second register for receiving and storing a second of the two input numbers, the second register having an output coupled to the second input of each of the first and second multiplier arrays for providing the second input number to the first and second multiplier arrays;
an adder coupled to the first and second outputs of the second multiplier array for respectively receiving and adding the intermediate sum and carry bits provided by the second multiplier array, said adder providing an accumulated completed product output; and
logic means coupled to the third outputs of the first and second multiplier arrays for receiving the portion of the final product provided during each of the plurality of multiply cycles and generating a Sticky-Bit concurrent with providing the intermediate sum and carry bits of the multiplication by a logic ORing of the third outputs of the first and second multiplier arrays to generate the Sticky-Bit before the accumulated completed product output is generated.

10. The multiplier circuit of claim 9 wherein the logic means further comprise:

a first OR gate having a plurality of inputs, each input being coupled to a predetermined bit of the final product provided during each of the plurality of multiply cycles by the first multiplier array, and having an output;

a second OR gate having a plurality of inputs, each input being coupled to a predetermined bit of the final product provided during each of the plurality of multiply cycles by the second multiplier array, and having an output;

a first transistor having a first current electrode coupled to the output of the first OR gate, a second current electrode, and a control electrode for receiving a first clock signal;

a second transistor having a first current electrode coupled to the output of the second OR gate, a second current electrode coupled to the second current electrode of the first transistor, and a control electrode for receiving a second clock signal, the first and second clock signals being non-overlapping; and a latch having an input coupled to the second current electrode of each of the first and second transistors, and an output for providing the Sticky-Bit.

11. The multiplier circuit of claim 10 wherein the latch is reset to a predetermined condition by a control signal before the multiplication of the two input numbers begins.

* * * * *